(12) United States Patent
Hunter

(10) Patent No.: US 7,389,966 B1
(45) Date of Patent: Jun. 24, 2008

(54) HANGER DEVICE

(76) Inventor: Anita T. Hunter, 3332 Northmont Rd., Windsor Mill, MD (US) 21244

( * ) Notice: Subject to any disclaimer, the term of this patent is extended or adjusted under 35 U.S.C. 154(b) by 0 days.

(21) Appl. No.: 11/856,575

(22) Filed: Sep. 17, 2007

(51) Int. Cl.
*F16B 45/00* (2006.01)
(52) U.S. Cl. ........................................ 248/304; 248/914
(58) Field of Classification Search ................ 248/317, 248/304, 288.11, 914
See application file for complete search history.

(56) References Cited

U.S. PATENT DOCUMENTS

| | | | | |
|---|---|---|---|---|
| 2,473,086 | A | * | 6/1949 | Montero ...................... 248/308 |
| 2,532,255 | A | * | 11/1950 | Davis ......................... 248/215 |
| 2,565,719 | A | | 8/1951 | Church |
| 3,240,463 | A | | 3/1966 | Cook |
| 3,321,166 | A | | 5/1967 | Gordon |
| 6,152,416 | A | | 11/2000 | Jacob |
| 7,322,554 | B2 | * | 1/2008 | Caroselli et al. ............. 248/304 |
| 2005/0161570 | A1 | * | 7/2005 | Bauerly ...................... 248/317 |
| 2006/0108497 | A1 | * | 5/2006 | Miranda ...................... 248/690 |
| 2008/0042032 | A1 | * | 2/2008 | Yap et al. .................... 248/304 |

* cited by examiner

*Primary Examiner*—Amy J. Sterling
(74) *Attorney, Agent, or Firm*—Crossley Patent Law; Mark A. Crossley

(57) ABSTRACT

A hanger device for securely hanging a purse, backpack or similar item from a variety of elevated surfaces, such as a table top or chair. The hanger device consists of a C-shaped continuous-piece frame having swiveling lower hook portion which may be locked into a desired position and an upper female receiver portion to which interchangeable end pieces for releasably securing the device to a surface are releasably engaged via a spring-release locking mechanism in the locking portion of each end piece. The end piece has a non-slip pad on its bottom side to prevent damage to a surface upon which its rests. The hanger device is preferably constructed of a metal, such as aluminum, or, alternatively, durable plastic. An alternative embodiment provides an end piece having a telescopic extension portion to adjust the length of the end piece for securing the hanger device surface of varying widths or depths.

20 Claims, 6 Drawing Sheets

HANGER DEVICE

FIELD OF THE INVENTION

The present invention relates to support hanger devices and, more specifically, to a hanger device to secure a purse or other similar item over an elevated surface, such as a table or chair and to prevent a purse from being set aside on a floor.

BACKGROUND OF THE INVENTION

Many support hangers have been developed in the past for suspending a weight from a horizontal surface or other types of surfaces. Such support hangers are generally either a type of hanger than includes a hook designed to engage or otherwise interact with an object from which the support hanger is suspended to counteract the tendency of the weight to disengage itself from the relatively stationary object to which the support is fixed, or a type of hanger which relies on the weight which is to be suspended to be directly below the point of engagement between the hanger and the object from which it is to be suspended in order to enable the hanger to have a relatively simple engagement portion with the object from which the weight is to be suspended. However, what is needed is a hanger device having a swiveling hook portion and a receiver portion along with interchangeable end pieces having a quick-release connector for adapting the device for use in connection with various elevated surfaces. End pieces containing a locking mechanism through which the desire end piece may be secured to a receiver portion are also needed. The present hanger device is versatile in its employment to keep a purse and its contents, or similar items such as a backpack, conveniently within reach, leaving both hands free for other purposes and which may be adapted for use on various types of surfaces. The present hanger device addresses the foregoing needs by being convenient and providing a swiveling hook portion and interchangeable telescopic end pieces, which may easily be adjusted to adapt such device for use on various surfaces in order to hang a purse, backpack, or similar item from or on a chair, table, or other surface.

SUMMARY OF THE INVENTION

The present hanger device is a continuous generally C-shaped frame having a 180-degree swiveling hook portion at lower end and a receiver portion for receiving interchangeable end pieces designed to rest atop a surface at an opposite upper end. The present hanger device is produced from a metal such as aluminum or durable plastic. Each end piece contains a locking mechanism for securing the end piece to the receiver portion. An alternative embodiment provides an end piece is telescopic to allow the hanger device to be adjusted and secured to a variety of elevated surfaces with an array of widths and depths. The end piece telescopes from 2 to 4 inches, preferably. The lower hook portion is employed to support a purse, backpack, or the like in an elevated position. The present hanger device is produced in a wide variety of colors and with a variety of ornate designs.

The present hanger device eliminates the need to put a purse or backpack on a floor where it may become dirty or come into contact with a multitude of germs. In addition, the present device reduces the chance that a purse will be stolen. Furthermore, the present hanger device reduces the likelihood that a purse will be stepped on, thus breaking either the purse or the contents therein. Also, the present hanger device eliminates the need to continually retrieve a purse as it falls from the back of a chair or slips off of a table.

As such, the general purpose of the improved hanger device which has all of the advantages of the prior art mentioned heretofore and many novel features that result in an improved hanger device which is not anticipated, rendered obvious, suggested, or even implied by the prior art, either alone or in combination thereof.

An object of the present hanger device to provide a hanger device which supports a purse in an elevated position on or from an elevated surface.

Another object of the present hanger device is to provide a hanger device having interchangeable end pieces for adaptation to a variety of surfaces.

Yet another object of the present hanger device is to provide a hanger device having interchangeable telescopic end pieces for securing the device to wide array of surface widths and depths.

Still another object of the present apparatus is to eliminate the need to place a purse, backpack, or the like on a floor while in a public place, such as a restaurant, office, church, classroom, or restroom, thereby preventing the purse or backpack from becoming dirty or in contact with germs.

Still yet another object of the present hanger device is to provide easy and safe access to a purse, backpack, or the like by hanging the item within reach while in a public venue.

Thus has been broadly outlined the more important features of the improved hanger device so that the detailed description thereof that follows may be better understood and in order that the present contribution to the art may be better appreciated.

These together with additional objects, features and advantages of the improved hanger device will be readily apparent to those of ordinary skill in the art upon reading the following detailed description of presently preferred, but nonetheless illustrative, embodiments of the improved hanger device when taken in conjunction with the accompanying drawings. In this respect, before explaining the current embodiments of the improved hanger device in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the concept of this disclosure may be readily utilized as a basis for the design of other structures, methods, and kits for carrying out the several purposes of the improved hanger device. It is therefore important that the claims be regarded as including such equivalent constructions insofar as they do not depart from the spirit and scope of the present invention.

Objects of the improved hanger device, along with various novel features that characterize the invention are particularly pointed out in the claims forming a part of this disclosure. For better understanding of the improved hanger device, its operating advantages and specific objects attained by its uses, refer to the accompanying drawings and description.

DETAILED DESCRIPTION OF THE DRAWINGS

With reference now to the drawings, and in particular FIGS. 1 through 6 thereof, examples of the employing the principles and concepts of the present hanger device, generally designated by the reference number 10, will be described.

Figure 1:
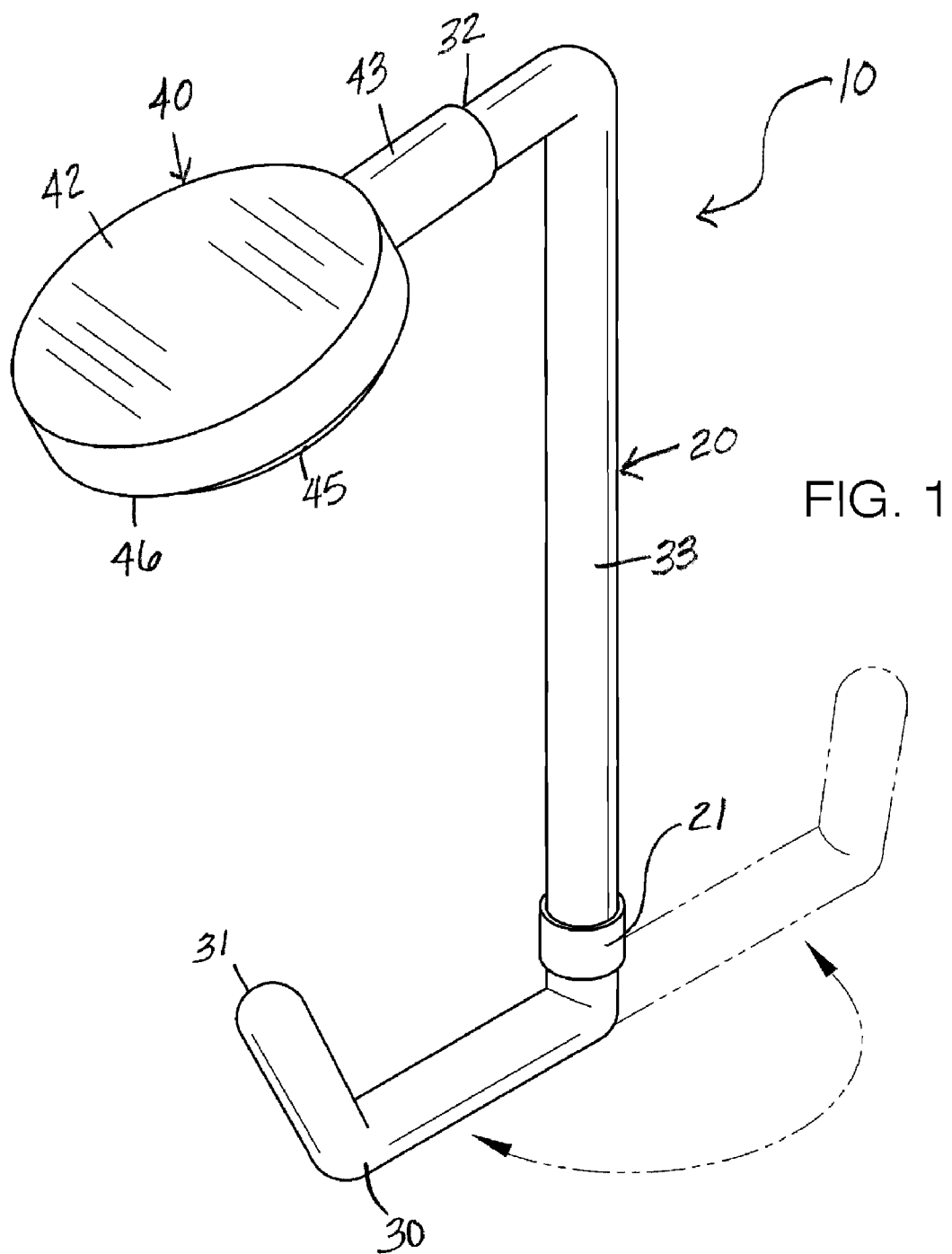
FIG. 1 is a right side isometric view.
Figure 2:
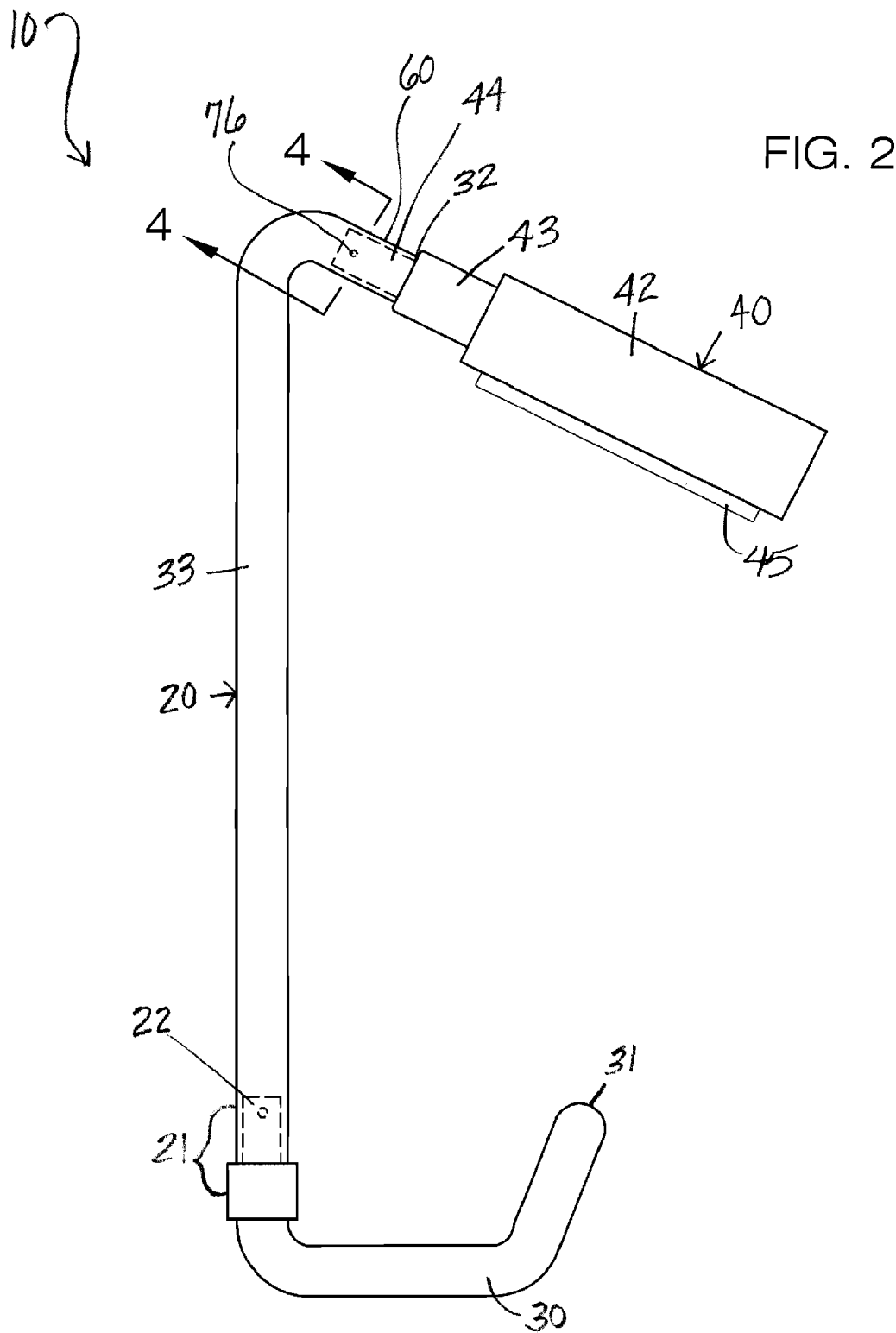
FIG. 2 is a left elevation view.
Figure 3:
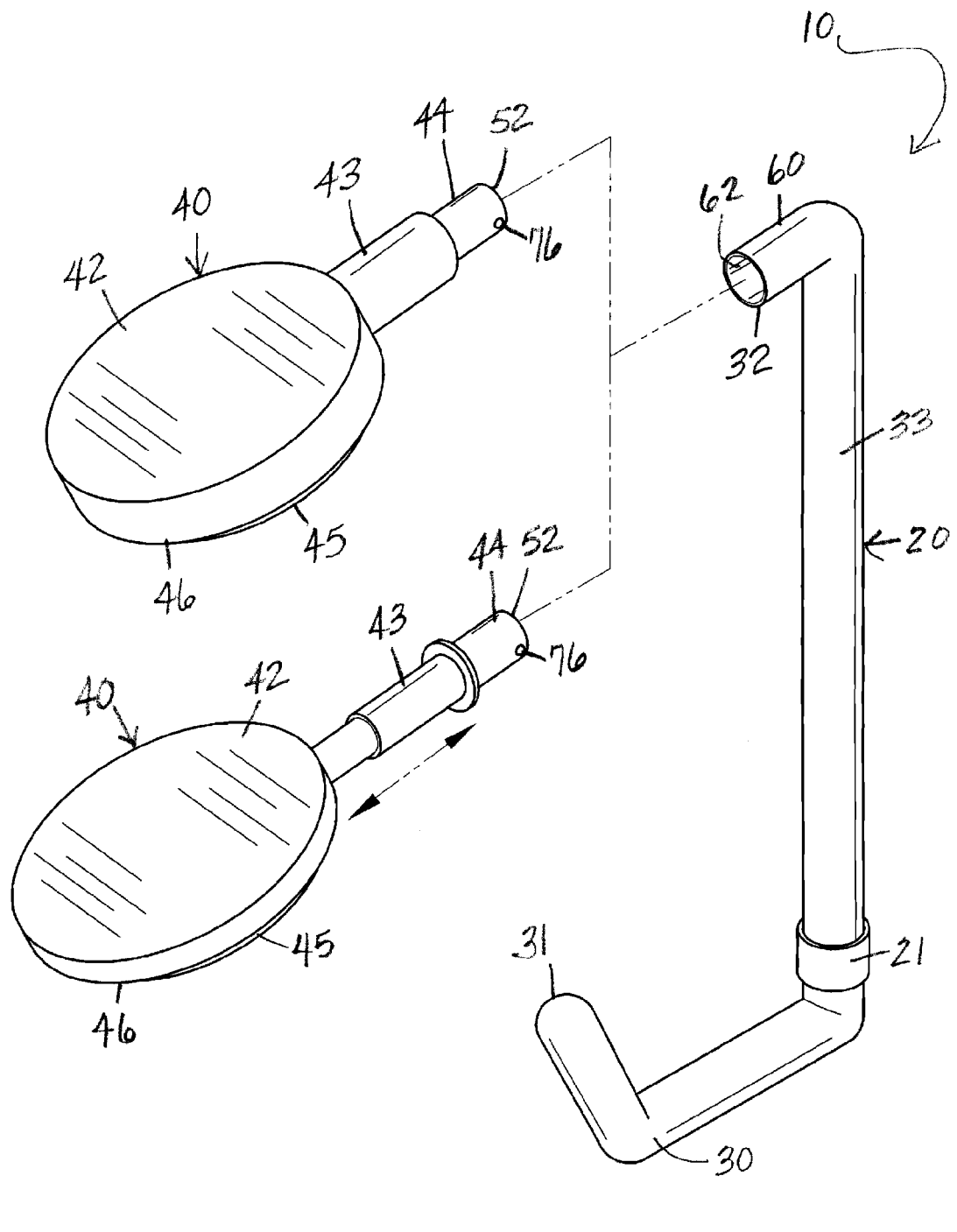
FIG. 3 is an exploded right side isometric view illustrating the interchangeability of end pieces.
Figure 4:
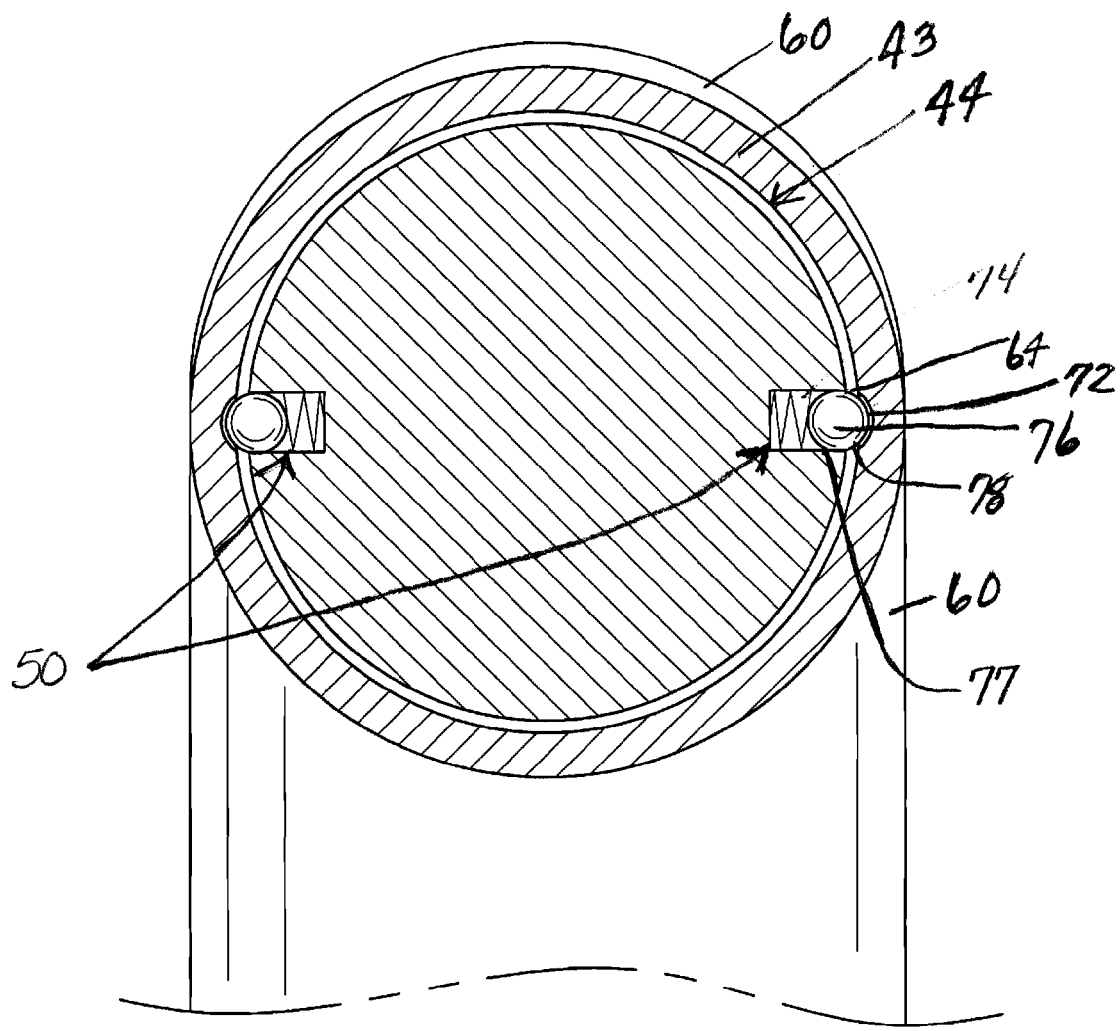
FIG. 4 is a cross-section view taken along line 4-4 of FIG. 2.
Figure 5:
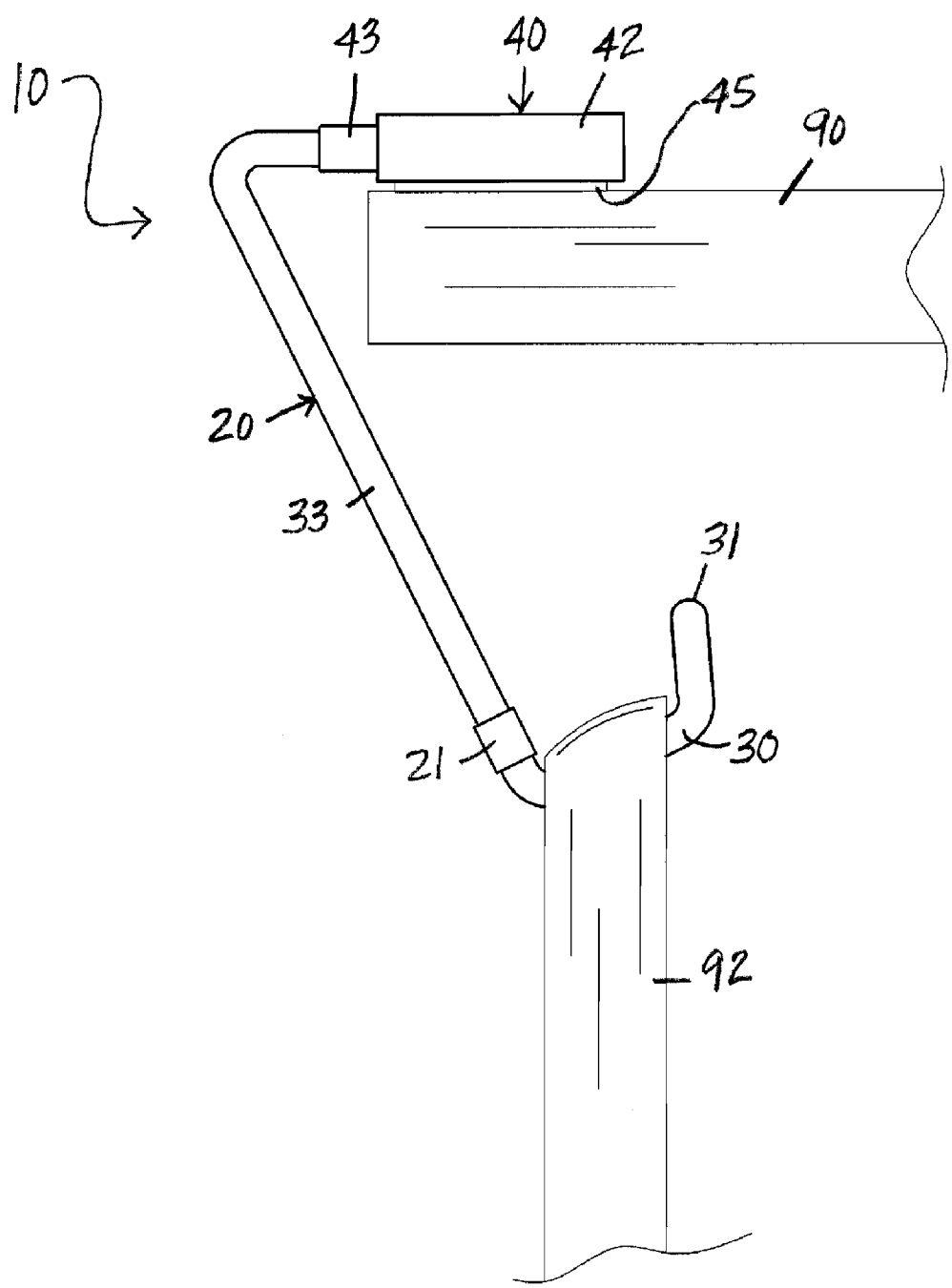
FIG. 5 is a left elevation view illustrating the present hanger device secured to an exemplary surface with a purse strap hanging over a hook portion.
Figure 6:
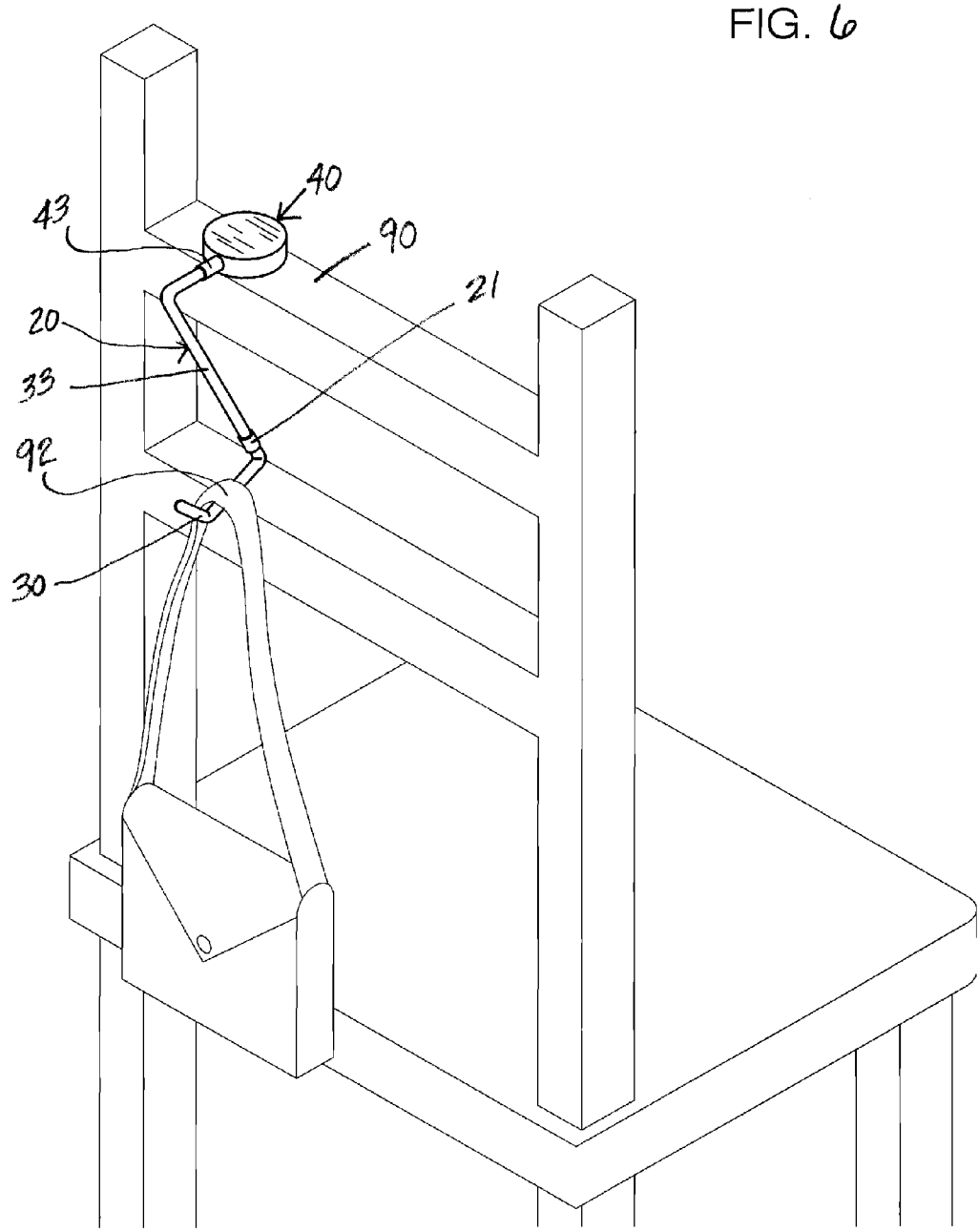
FIG. 6 is a perspective view illustrating the present hanger device secured to a chair as an exemplary surface with a purse strap hanging over a hook portion.

Referring to FIGS. 1 through 5, the present hanger device 10 comprises a cylindrical C-shaped continuous-piece frame 20 having a female receiver portion 60 on an upper second end 32, an upwardly turned hook portion 30 on an opposite lower first end 31 for supporting an item such as purse or the like, a mid-section 33 between the first end and second end, and a swiveling joint 21 at the juncture between the mid-section portion 33 and the lower first end 31 for swiveling attachment of the hook portion 30 to frame 20. The swiveling joint 21 has a locking means 22 for locking the hook portion 30 into a desired position. Said locking means 22 comprises a spring-release mechanism as described hereinbelow for the locking mechanism 50 of the locking portion 44. Further, the swiveling joint swivels 180 degrees, preferably; provided, however, that the swiveling joint 21 may swivel 360 degrees. The female receiver portion 60 has an aperture 62 for receiving a locking portion 44 of an end piece. At least one removable end piece 40 comprises an outer member 42, a cylindrical extension portion 43 that extends outwardly from the outer member 42, and a cylindrical male locking portion 44 that extends outwardly from said extension portion 43, said locking portion 44 having slightly smaller diameter than said extension portion 43. An end piece 40 may be disc-shaped as illustrated in the drawings; provided, however, an end piece 40 may be provided in a wide variety of shapes and sizes to accommodate releasable engagement for supporting a purse, backpack, or the like onto a wide variety of surfaces. The male locking portion 44 of the end piece 40 is releasably engageable via a locking mechanism 50 to the female receiver portion 60 of the frame 20. FIG. 3 illustrates a cylindrical telescopic extension portion 43 between said outer member 42 and said locking portion 44 for adjusting the length to accommodate releaseable engagement of the hanger device 10 to a wider or deeper surface 90. Said telescopic extension portion 43 preferably telescopes from approximately 2 to 4 inches. Said outer member 42 has non-slip material pad 45 on its bottom side 46 for non-slip engagement of the device 10 to a surface 90 allowing the device 10 to hang. As illustrated in FIG. 4, said male locking portion 44 protrudes forwardly from said extension portion 43. Said locking portion 44 contains a spring-release locking mechanism 50 for releasable engagement of an end piece 40 to the aperture 62 of the receiver portion 60 of the frame 20. The locking mechanism 50 is located on the distal end 52 of the locking portion 44. Said locking mechanism 50 for releasably engaging inside the aperture 62 of the receiver portion 60 comprises a short, generally rectangular, metal strip 74 extending inwardly from each side of the inner circumference 64 of the locking portion, a round spring-release ball 76 attached to the outer edge 77 of each strip 74, and a lunar-shaped indentation 72 adjacent to and conforming to the shape of the outer side 78 of each spring-release ball 76. Said strip 74 may also be constructed of durable plastic. Said end pieces 40 are constructed in various shapes and sizes to accommodate engagement to a variety of surfaces 90. FIG. 5 illustrates the use of the present hanger device 10 in which the end piece 40 is positioned with the pad 45 placed atop an exemplary surface 90 and with the hook portion 30 positioned below said surface 90. A strap 92 of a purse, backpack or other strap bearing items is hung over the hook portion 30 in a manner such that said strap 92 hangs vertically below said surface 90. Said hanger device 10 is preferably produced from aluminum, however, said device 20 may also be constructed of durable plastic.

With respect to the above description then, it is to be realized that the optimum dimensional relationships for the parts of the hanger device, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A hanger device comprising:
    a cylindrical C-shaped continuous-piece frame comprising:
        a female receiver portion on an upper second end of said frame, said female receiver portion having an aperture for releasable engagement of a male locking portion of an end piece;
        an upwardly turned hook portion on an opposite lower first end of said frame for hanging an item;
        a mid-section portion between the first end and second end; and
        a swiveling joint at the juncture between the mid-section portion and the lower first end for swiveling attachment of said hook portion to said frame, said swiveling joint having a locking means for locking the hook portion into a desired position; and
    at least one end piece intended to removably engage a surface allowing said hanger device to hang from said surface, said end piece further comprising:
        an outer member that removably engages a surface allowing said hanger device to hang from said surface;
        a cylindrical extension portion extending outwardly from said outer member; and
        a cylindrical male locking portion extending outwardly from said extension portion, said locking portion further comprising:
            an inner circumference;
            a rectangular strip extending inwardly from each side of said inner circumference;

a spring-release ball attached to an outer edge of each of said strip; and a lunar-shaped indentation adjacent to and conforming to the shape of the outer side of each ball for releasable engagement to said female connector portion of said frame.

2. The hanger device of claim 1 wherein said swiveling joint provides a 180-degree swiveling attachment of said hook portion to said frame.

3. The hanger device of claim 1 wherein said outer member further comprises a pad constructed of non-slip material on the bottom side of said outer member for non-slip engagement of said end piece to an elevated surface allowing the hanger device to hang securely without damage to said surface.

4. The hanger device of claim 1 wherein said extension portion is telescopic for adjustment of the length of said end piece to accommodate releasable engagement of said hanger device to a wide surface.

5. The hanger device of claim 1 wherein said outer member further comprises a pad constructed of non-slip material on the bottom side of said outer member for non-slip engagement of said end piece to an elevated surface allowing the hanger device to hang securely without damage to said surface and wherein said extension portion is telescopic for adjustment of the length of said end piece to accommodate releaseable engagement of said hanger device to a wide surface.

6. The hanger device of claim 1 wherein said hanger device is constructed of metal.

7. The hanger device of claim 1 wherein said hanger device is constructed of durable plastic.

8. The hanger device of claim 2 wherein said hanger device is constructed of metal.

9. The hanger device of claim 2 wherein said hanger device is constructed of durable plastic.

10. The hanger device of claim 3 wherein said hanger device is constructed of metal.

11. The hanger device of claim 3 wherein said hanger device is constructed of durable plastic.

12. The hanger device of claim 4 wherein said extension portion telescopes in a range from 2 to 4 inches.

13. The hanger device of claim 4 wherein said hanger device is constructed of metal.

14. The hanger device of claim 4 wherein said hanger device is constructed of durable plastic.

15. The hanger device of claim 5 wherein said hanger device is constructed of metal.

16. The hanger device of claim 5 wherein said hanger device is constructed of durable plastic.

17. The hanger device of claim 6 wherein said metal is aluminum.

18. The hanger device of claim 8 wherein said metal is aluminum.

19. The hanger device of claim 10 wherein said metal is aluminum.

20. The hanger device of claim 13 wherein said metal is aluminum.

\* \* \* \* \*